United States Patent Office 2,711,986
Patented June 28, 1955

2,711,986
PROCESS FOR BONDING RUBBER TO CHLOROSULFONATED POLYMERS

Daniel E. Strain, Wilmington, Del., and Thomas H. Crim, Terre Haute, Ind., assignors to E. I. du Pont de Nemours and Company, Wilmington, Del., a corporation of Delaware No Drawing. Application December 2, 1952,
Serial No. 323,704

2 Claims. (Cl. 154—139)

This invention relates to a process for bonding rubber to chlorosulfonated polyethylene or related elastomeric materials. It also relates to a cement composition which is effective for bonding cured natural rubber to chlorosulfonated polyethylene rubber.

Rather recently chlorosulfonated polyethylene has been placed on the market as a new synthetic rubber, and methods for compounding and curing it have been disclosed (Rubber Age, May 1952, pages 205–221; Chemical and Engineering News, May 12, 1952, page 1966; U. S. Patents 2,416,060, 2,416,061, 2,586,363). The use of this composition as an adhesive is disclosed in copending application S. N. 654,822, filed March 15, 1946, now U. S. Patent No. 2,630,398, issued March 3, 1953, in which the subject matter of the present invention is disclosed.

An object of this invention is to provide a composition and method for bonding vulcanized natural rubber to cured chlorosulfonated polyethylene rubber. Other objects of the invention will appear hereinafter.

The present invention provides a process for producing a bond between cured natural rubber and cured chlorosulfonated polyethylene rubber. In general, the bonds produced by the process of this invention have tensile strengths well over 1000 pounds per square inch, and in many instances over 2500 pounds per square inch. The process of the invention comprises applying uncured chlorosulfonated polythene rubber in the form of a solution in an organic solvent, and having admixed therewith one or more vulcanizing aids, to the surface of cured natural rubber, and also to the surface of uncured chlorosulfonated polythene rubber which has been compounded with one or more vulcanizing aids, and thereafter maintaining these coated surfaces in contact with each under the action of heat and pressure until a bond having a tensile strength (measured at ordinary temperatures) of at least 1000 pounds per square inch is produced.

The vulcanizing aids employed with the solution of chlorosulfonated polyethylene include metal oxides (particularly polyvalent metal oxides such as litharge, magnesia, zinc oxide, red lead and barium oxide), salts of polyvalent metals with weak acids such as, zinc stearate, lead abietate, lead maleate, magnesium adipate, calcium carbonate, lead naphthenate, lead stearate, and the like; organic peroxy compounds, including hydroperoxides, diacyl peroxides, dialkyl peroxides, etc.; weak monobasic or polybasic acids of high molecular weight such as stearic acid or rosin; antioxidants and/or vulcanization accelerators such as, diphenylamine, mercaptobenzothiazole, tetramethyl thiuram disulfide, phenylbetanaphthylamine, and AgeRite Alba (an antioxidant and rubber accelerator marketed by R. T. Vanderbilt Company, and considered to be, essentially, a high molecular weight phenolic compound); fillers or reenforcing agents such as carbon black, barium sulfate, kaolin, diatomaceous earth, powdered talc, titanium dioxide, and calcium sulfate. Sulfur may also be included in the composition, but it is generally omitted since the vulcanization of the chlorosulfonated polymers takes place readily in the absence of sulfur. The quantities of these agents which give best results are, per 100 parts of the chlorosulfonated polymer: oxide of polyvalent metal, 2 to 60 parts, preferably 10 to 20 parts and with litharge especially 30 to 60 parts; rosin or equivalent, 0 to 30 parts, preferably 2 to 10 parts; antioxidant, 0.0 to 3.0, preferably 0.5 to 2.0 parts; accelerator, 0 to 8 parts, preferably 1 to 5 parts; inert fillers, or reenforcing agents, 0 to 500 parts, especially 0 to 30 parts. If desired, certain organic modifiers or extenders may be added to the vulcanization mixture. These include asphalt, polyisobutylene, polythene, "Kenflex" B (a polymeric naphthenic petroleum hydrocarbon), factice, pine tar, and high-boiling esters such as Flexalyn (diethylene glycol abietate, marketed by Hercules Powder Company). These organic modifiers or extenders may be employed in quantity equivalent to from 0 to 100 parts per part of the uncured chlorosulfonated polymer, preferably 0 to 20 parts per 100 parts thereof. While numerous formulations may be employed, the most outstanding results are obtained when the chlorosulfonated polythene is cured in the presence of litharge and rosin, and preferably also in the presence of one or more vulcanization accelerators.

The preferred curing conditions for forming an adhesive bond by the method of this invention include the use of a temperature of about 100° to 300° C. and a sufficient pressure to cause uncured chlorosulfonated polythene to flow. The curing is most advantageously carried out at a temperature of 100° to 160° C., for a period of about 10 to 60 minutes, under a pressure of from about 15 to 500 pounds per square inch. Usually there is evidence of curing as the temperature approaches 60° C., although temperatures of 100° C. or slightly higher are generally employed. For most purposes there is no need for temperatures in excess of 180° C. during the curing operation, and temperatures in excess of 300° C. are not desired since they cause degradation of the chlorosulfonated polymer with the resultant formation of comparatively weak adhesive bonds.

The invention is illustrated further by means of the following examples.

*Example 1.*—A cement was prepared by admixing 10 grams of a compounded batch (made by milling 100 parts by weight chlorosulfonated polythene having a chlorine content of 30.0% and a sulfur content of 1.74% with 1 part AgeRite Alba, 1 part mercaptobenzothiazole, 10 parts of rosin and 40 parts of litharage) with 100 cc. of xylene. This cement was applied to cured smoked sheet rubber (having been compounded with 1 part AgeRite Alba, 1 part mercaptobenzothiazole, 10 parts zinc oxide, 50 parts carbon black, 5 parts stearic acid and 2 parts of sulfur, and cured for 60 minutes at 140° C.) and uncured chlorosulfonated polythene (compounded with 1 part AgeRite Alba, 1 part mercaptobenzothiazole, 10 parts of rosin and 40 parts of litharge), and the cement-coated surfaces were placed in contact. The resulting composition was heated in a press at a temperature of 155° C. for 15 minutes which caused the rubber and chlorosulfonated polythene to become adhesively bonded. The tensile strength of the resultant bond was 2700 pounds per square inch. Similar experiments were made with numerous solvents in place of xylene, viz. n-butyl acetate, carbon tetrachloride, and benzene; in these experiments the strength of the adhesive bond varied from 1150 to 2200 pounds per square inch.

*Example 2.*—Example 1 was repeated with xylene as the solvent, except that the compounded batch, used in making the cement, contained, in addition to the recited ingredients, 60 parts of Flexalyn. The tensile strength of the resultant adhesive bond was 2600 pounds per square inch.

It is to be understood that the foregoing examples are illustrative only and that many different embodiments of the invention will occur to those who are skilled in the art. For example, the products obtained in accordance with the process of this invention may be prepared in various pigmented forms, a wide variety of colors being possible through the use of appropriate pigmenting agents. Moreover, it is to be understood that the invention contemplates the use of tackifiers such as dibutyl phthalate, etc., to improve the adhesive bond prior to curing, it being obviously desirable in various practical methods for manufacturing the cured product to have a reasonably firm bond in the uncured stage. The method of applying the cement to the surfaces to be joined can be varied widely, a suitable method being to brush the cement on one or both surfaces prior to placing them in contact.

Any inert solvent for chlorosulfonated polythene may be employed in practicing the invention. Omission of the solvent produces relatively poor results (cf. copending application Ser. No. 258,984, filed November 29, 1951, now U. S. Patent No. 2,683,103).

The invention is especially useful in the manufacture of retread tires and tires having white or otherwise pigmented sidewalls and/or treads. One of the outstanding characteristics of such tires is their resistance to prolonged use and their relative inertness towards air or other oxidizing agents.

Since many different embodiments may be made without departing from the spirit and scope thereof, it is to be understood that we do not limit ourselves except as set forth in the following claims.

We claim:
1. A process for bonding chlorosulfonated polyethylene rubber to cured natural rubber which comprises applying to the surface of uncured chlorosulfonated polyethylene rubber, compounded with curing aids comprising litharge and rosin, and to the surface of cured natural rubber, a cement in which uncured chlorosulfonated polyethylene rubber is dissolved in an inert organic solvent, said cement having admixed therein curing aids comprising litharge and rosin, maintaining a contact between said surfaces at a temperature of 100° to 160° C. for a period of 10 to 60 minutes under a pressure of 15 to 500 pounds per square inch until a bond having a tensile strength in excess of 1000 pounds per square inch is produced between the said cured natural rubber and the resulting cured chlorosulfonated polyethylene rubber.

2. Process of claim 1 in which the said inert organic solvent for the chlorosulfonated polyethylene is xylene.

References Cited in the file of this patent
UNITED STATES PATENTS
2,630,398    Brooks et al. _____ Mar. 3, 1953